(12) United States Patent
Mimis

(10) Patent No.: US 10,068,459 B2
(45) Date of Patent: Sep. 4, 2018

(54) UNIVERSAL REMINDER DEVICE

(71) Applicant: Dan Mimis, Waco, TX (US)

(72) Inventor: Dan Mimis, Waco, TX (US)

( * ) Notice: Subject to any disclaimer, the term of this patent is extended or adjusted under 35 U.S.C. 154(b) by 0 days.

(21) Appl. No.: 15/617,484

(22) Filed: Jun. 8, 2017

(65) Prior Publication Data
US 2017/0358199 A1  Dec. 14, 2017

Related U.S. Application Data

(60) Provisional application No. 62/349,184, filed on Jun. 13, 2016.

(51) Int. Cl.
| | | |
|---|---|---|
| *G08B 21/24* | (2006.01) | |
| *B60N 2/00* | (2006.01) | |
| *G08B 21/22* | (2006.01) | |
| *B60N 2/28* | (2006.01) | |
| *B60R 21/015* | (2006.01) | |

(52) U.S. Cl.
CPC .......... *G08B 21/245* (2013.01); *B60N 2/002* (2013.01); *G08B 21/22* (2013.01); *B60N 2/28* (2013.01); *B60R 21/01554* (2014.10); *B60R 21/01556* (2014.10)

(58) Field of Classification Search
CPC .. G08B 21/245; G08B 21/02; G08B 21/0202; G08B 21/0205; G08B 21/0219
See application file for complete search history.

(56) References Cited

U.S. PATENT DOCUMENTS

| | | | | |
|---|---|---|---|---|
| 6,998,988 B1 * | 2/2006 | Kalce | ..................... | B60N 2/002 340/457.1 |
| 7,106,207 B1 * | 9/2006 | Marchan | ................ | B60N 2/002 340/438 |
| 2009/0040036 A1 * | 2/2009 | Talis | ..................... | B60N 2/002 340/457.1 |
| 2017/0182938 A1 * | 6/2017 | Byrd | ....................... | B60Q 9/00 |

* cited by examiner

*Primary Examiner* — Omar Casillashernandez
(74) *Attorney, Agent, or Firm* — Baylor Law School Intellectual Property and Entrepreneur Clinic; David G. Henry

(57) ABSTRACT

A universal reminder device in the form of a series circuit including a power source, a warning indicator, a pressure-sensitive normally closed momentary switch, and a pressure-sensitive normally open momentary switch.

1 Claim, 4 Drawing Sheets

UNIVERSAL REMINDER DEVICE

CROSS-REFERENCE TO RELATED APPLICATIONS

The present application claims priority from U.S. Provisional Patent Application Ser. No. 62/349,184, filed Jun. 13, 2016, the contents of which are incorporated in this disclosure by reference in their entirety.

The present invention relates to an alerting system with the functionality to keep its user reminded in various environments.

BRIEF DESCRIPTION

The various embodiments of this present invention are designed to provide an inexpensive device which requires no installation tools or skills and which will prevent people from forgetting important items (including toddlers) that have been placed in various environments including, but not limited to, homes, workplaces, hotel rooms and cars/motor vehicles.

In accordance with one aspect of the present invention, a universal reminder device is in the form of a series circuit including a power source, a warning indicator, a pressure-sensitive normally closed momentary switch, and a pressure-sensitive normally open momentary switch.

In accordance with another aspect of the present invention, a universal reminder device is in the form of a series circuit including a power source, a warning indicator, a first pressure-sensitive normally open momentary switch, and a second pressure-sensitive normally open momentary switch.

In accordance with another aspect of the present invention at least one of the pressure sensitive switches is remotely controlled.

In accordance with another aspect of the present invention, the warning indicator can be either a sound indicator or a light indicator.

According to another aspect of the present invention, a universal reminder device is in the form of a series circuit including a power source, a warning indicator, a selectable connection between a pressure-sensitive normally closed momentary switch and a pressure-sensitive normally open momentary switch, and an additional pressure-sensitive normally open momentary switch.

BRIEF DESCRIPTION OF THE DRAWING FIGURES

The invention will be explained in more detail in the following with reference to embodiments and to the drawings which are shown:

DETAILED DESCRIPTION

Persons of ordinary skill in the art will realize that the following description of the present invention is illustrative only and not in any way limiting. Other embodiments of the invention will readily suggest themselves to such skilled persons.

Figures 1A, 1B:
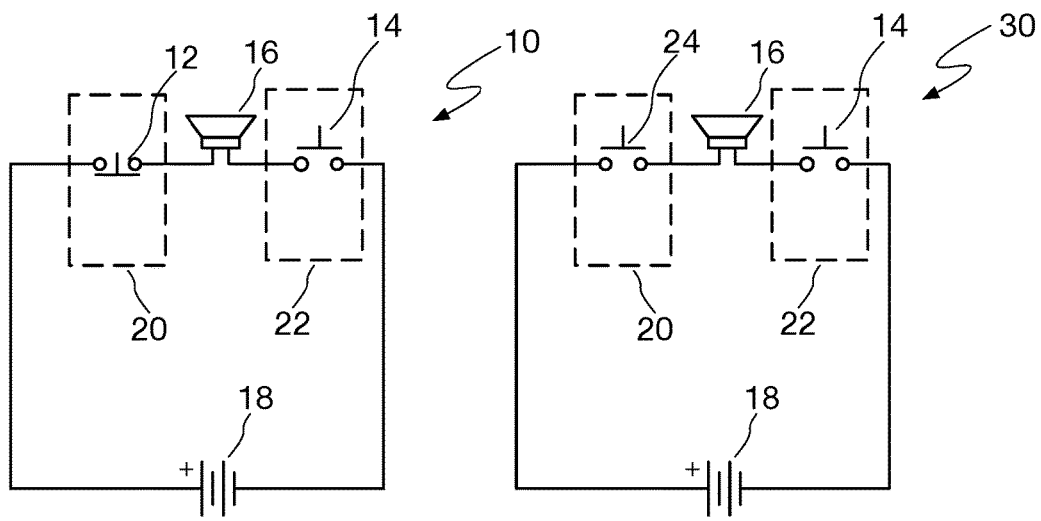
FIG. 1A is a schematic diagram that illustrates a universal reminder device in accordance with one aspect of the present invention.
FIG. 1B is a schematic diagram that illustrates a universal reminder device in accordance with another aspect of the present invention.

Referring first of all to FIG. 1A, a drawing that shows the general electrical diagram of a universal reminder device 10 in accordance with the present invention.

In accordance with a first aspect of the present invention, a universal reminder device 10 of FIG. 1A includes a normally-closed momentary switch 12, a normally-open momentary switch 14, a buzzer 16 or other sound source such as a speaker driven by an audio oscillator, and a power source 18 such as a battery. Switches 12 and 14 are pressure/weight sensor switches but are shown in FIG. 1 as simple switches to promote a clear understanding of the invention.

The normally-closed momentary switch 12 is incorporated into a first pad (shown within dashed lines 20) and will sense if any pressure is applied on first pad 20 by opening. The normally-open momentary switch 14 is incorporated into a second pad (shown within dashed lines 22). The normally-open momentary switch 14 will sense if any pressure is applied on second pad 22 by closing. Persons of ordinary skill in the art will appreciate that different embodiment of the invention may employ mechanical switches or solid-state switches. Such skilled persons will also appreciate that, in certain embodiment of the invention, optical sensors may be employed to detect the presence of an object on the first pad and the second pad.

The term pad is intended herein to include all structures containing the switches, including discrete pads as well as switches incorporated into seats, mats and other structures as suggested by the context of the disclosure herein.

The operation of universal reminder device 10 of FIG. 1A is explained in Table A.

In accordance with one aspect of the present invention, the universal reminder device 10 may be incorporated into a motor vehicle to remind a driver when an object has been left in the vehicle. Persons of ordinary skill in the art will appreciate that the object may be a living thing such as a child or pet, or an inanimate object such as a purse or briefcase. In this embodiment of the invention, the first pad 20 is placed on or incorporated into the driver seat of the vehicle and the second pad 22 may be placed on or incorporated into another portion of the vehicle such as a rear seat or storage area in a sport utility vehicle, etc.

Table A included below demonstrates the behavior of the universal reminder device 10 of FIG. 1A in response to the presence or absence of objects on the first pad 20 and the second pad 22.

TABLE A

| Object Present on Second Pad 22? (Is switch 14 closed?) | Object Present on First Pad 20? (Is switch 12 open?) | Alarm |
| --- | --- | --- |
| YES | YES | Silent |
| YES | NO | ALARM SOUNDS |

TABLE A-continued

| Object Present on Second Pad 22? (Is switch 14 closed?) | Object Present on First Pad 20? (Is switch 12 open?) | Alarm |
|---|---|---|
| NO | YES | Silent |
| NO | NO | Silent |

When the universal reminder device 10 is employed in a typical motor vehicle application as described herein, Table A shows that as long as the driver is in the driver seat, normally-closed momentary switch 12 in the first pad 20 associated with the driver seat is open and the alarm is silent since there is no circuit completed between the battery 18 and the buzzer 16. However, when the driver exits the driver seat, normally-closed momentary switch 12 closes. With normally-closed momentary switch 12 closed, the buzzer 20 will sound only if there is an object on the second pad 22 having enough weight (or exhibiting another selected property for other switch types) to close switch 14 to complete the circuit between the battery 18 and the buzzer 16. Thus the vehicle driver is warned that the object, child, pet, purse, briefcase, etc. is still present on second pad 22 as she is exiting the vehicle.

Persons of ordinary skill in the art will understand that the sound of the alarm does not have to be an annoying noise; other indicia, such as other sounds, or light indications may be used.

In accordance with another aspect of the present invention, a universal reminder device 30 is shown in FIG. 1B. For an ease of understanding the present invention, elements of universal reminder device 30 in FIG. 1B that correspond to elements of universal reminder device 10 of FIG. 1A are designated using the same reference numerals used to designate those elements in FIG. 1A.

Universal reminder device 30 includes a normally-open momentary switch 24, a normally-open momentary switch 14, a buzzer 16 or other sound source such as a speaker driven by an audio oscillator, and a power source 18 such as a battery. Normally-open momentary switches 24 and 14 are pressure/weight sensor switches but are shown in FIG. 1B as simple switches to promote a clear understanding of the invention.

The normally-open momentary switch 24 is incorporated into a first pad (shown within dashed lines 20) and will sense if any pressure is applied on first pad 20 by closing. The normally-open momentary switch 14 is also incorporated into a second pad (shown within dashed lines 22). The normally-open momentary switch 14 will sense if any pressure is applied on second pad 22 by closing. Persons of ordinary skill in the art will appreciate that different embodiment of the invention may employ mechanical switches or solid-state switches. Such skilled persons will also appreciate that, in certain embodiment of the invention, optical sensors may be employed to detect the presence of an object on the first pad and the second pad.

To use the universal reminder device 30 of the present invention, the user will place anything that she does not want to leave behind (in her home, or office, or hotel room) on the second pad 22. This action closes second switch 14.

The first pad 20 may be, for example, a doormat placed just inside the exit door of the space she is occupying. When the user steps on the doormat to leave the space, the normally-open momentary switch 24 will close and this action will complete a circuit between the battery and the buzzer, sounding the alarm if an object is present on second pad 22. Persons of ordinary skill in the art will readily observe that instrumentalities other than a doormat switch can be used as normally-open momentary switch 24 to implement this aspect of the present invention. For example switch 24 can be replaced with a sensor that will detect the motion of the object into which it is incorporated. Examples of such detectors include inertial sensors, accelerometers, vibration sensors, etc. When the user will leave the home or the room she will have to grab her keys or other object that includes the sensor in preparation for leaving the house or room, the motion detector associated with the object will activate the alarm if there is anything on the second pad 22. Alternately, the object containing the sensor can be removed from the key ring and hung by the interior knob of the exit door so the user can't possible exit her house (or hotel room, or office) without activating the sensor to be reminded that there is something on the second pad 22. If the user can leave the house through multiple doors (such as front door, garage door or back/side door) then sensors can be used for each door, and multiple switches 24 can be paralleled as needed.

The behavior of the universal reminder device 30 of FIG. 1B is shown in Table B.

TABLE B

| Object Present on Second Pad 22? (Is switch 14 closed?) | Object Present on First Pad 20? (Is switch 24 closed?) | Alarm |
|---|---|---|
| YES | YES | ALARM SOUNDS |
| YES | NO | Silent |
| NO | YES | Silent |
| NO | NO | Silent |

Figure 2:
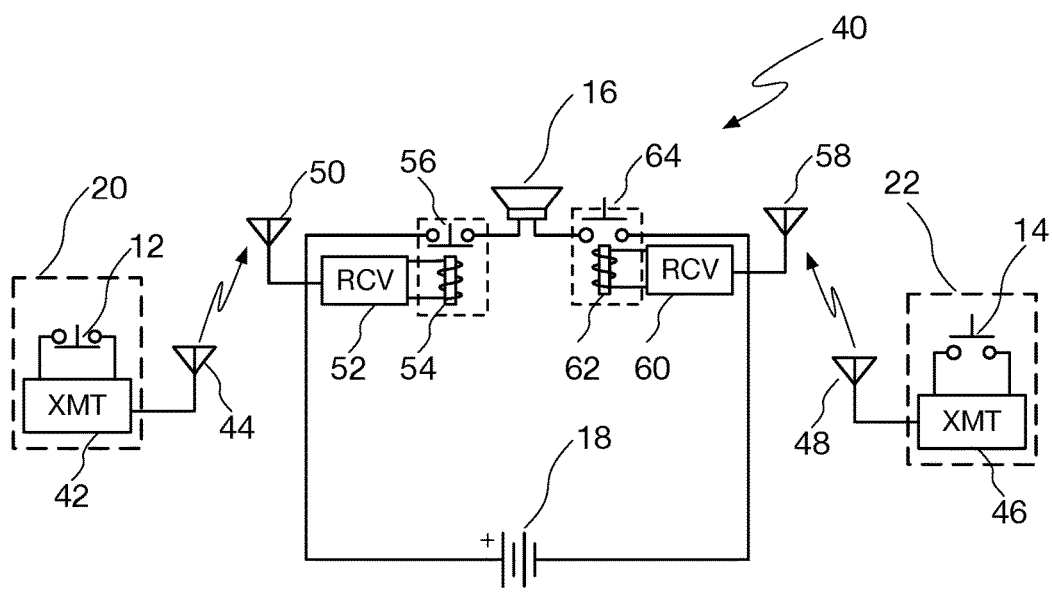
FIG. 2 is a schematic diagram that illustrates a wireless version of the universal reminder device of FIG. 1A that may be used in a wide variety of environments.

In accordance with another aspect of the present invention, a universal reminder device 40 of the present invention using remote switches may be employed to remind a user to take an object with them when they exit a room or a building. According to this aspect of the invention, a wireless version of the universal reminder device 40 is shown in FIG. 2. For an ease of understanding the present invention, elements of universal reminder device 40 in FIG. 2 that correspond to elements of universal reminder device 10 of FIG. 1A are designated using the same reference numerals used to designate those elements in FIG. 1A.

In FIG. 2, first pad 20 including first switch 12 is shown remotely from the circuit including the buzzer 16 and the battery 18. Normally-closed momentary switch 12 is coupled to a radio frequency (RF) transmitter 42 coupled to antenna 44. Similarly, the second pad 22 including normally-open momentary switch 14 is also shown remotely from the circuit including the buzzer 16 and the battery 18. Normally-open momentary switch 14 is coupled to a radio frequency (RF) transmitter 46 coupled to antenna 48. Persons of ordinary skill in the art will appreciate that batteries (not shown) will be included in the first pad 20 and second pad 22 to power transmitters 42 and 46, respectively. In one embodiment of the invention, transmitter 42 is configured to generate an RF signal only when normally-closed momentary switch 12 is opened in response to pressure sensed on first pad 20. Persons of ordinary skill in the art will appreciate that the RF links described herein can be formed using technologies such as but not limited to WiFi and will be readily able to implement such links.

RF energy from transmitter 42 is coupled to antenna 50 and to receiver 52. Receiver 52 drives relay 54 to open relay switch 56 in response to the received RF signal from transmitter 42. Relay/switch assemblies are well known in the art. Similarly, RF energy from transmitter 46 is coupled to antenna 58 and to receiver 60. Receiver 60 drives relay 62 to close relay switch 64 in response to the received RF signal from transmitter 46. In this manner, switches 12 and 14 may be located remotely from the main circuitry including the buzzer 16 and battery 18.

In the particular embodiment shown in FIG. 2, both first and second pads 20 and 22 containing, respectively, switches 12 and 14 are both shown located remotely from the remainder of the circuit but persons of ordinary skill in the art will appreciate that embodiments of the present invention are contemplated where only one of the first and second pads 20 and 22 and switches 12 and 14 is located remotely while the other one can be disposed locally with the remainder of the circuit components. For example, first pad 20 can be co-located with the main portion of the circuitry including the buzzer 16 and the battery 18, while the second pad 22 can be located remotely and coupled to the remainder of the circuitry using the RF link just described. Embodiments where both first and second pads 20 and 22 and switches 12 and 14 can be located remotely but are hardwired to the remainder of the circuitry are also contemplated within the scope of the present invention although such embodiments would require wire runs to couple the first and second switches to the remainder of the circuitry.

In one exemplary non-limiting embodiment, both the first pad 20 and the second pad 22 can have, for example, a rectangular shape and can be example, the size of a credit card so they can be comfortably carried in a pocket, making the universal reminder device 40 completely portable.

To use the universal reminder device 40 of the present invention, the user will place anything that she does not want to leave behind (in her home, or office, or hotel room) on the second pad 22. This action closes normally-open momentary switch 14 which then remotely closes relay switch 64.

The user will place something on the first pad 20 that she will not leave her house without, like her car/home keys. This latter action opens normally-closed momentary switch 12 which remotely opens the relay switch 56. When she later picks up her keys to leave, the switch 12 will close and this action will remotely cause relay switch 56 to close. Because the object that she does not want to forget has kept the second switch 14 closed, relay switch 64 is also closed, completing the circuit between the battery 18 and the buzzer 16. The buzzer 16 will sound, reminding her to also pick up the object placed on the second pad 22.

Persons of ordinary skill in the art will appreciate that, in accordance with another aspect of the present invention, the switch 24 of FIG. 1B can be substituted for switch 12 in FIG. 2 to implement a remote version of the embodiment shown in FIG. 1B.

Figure 3:
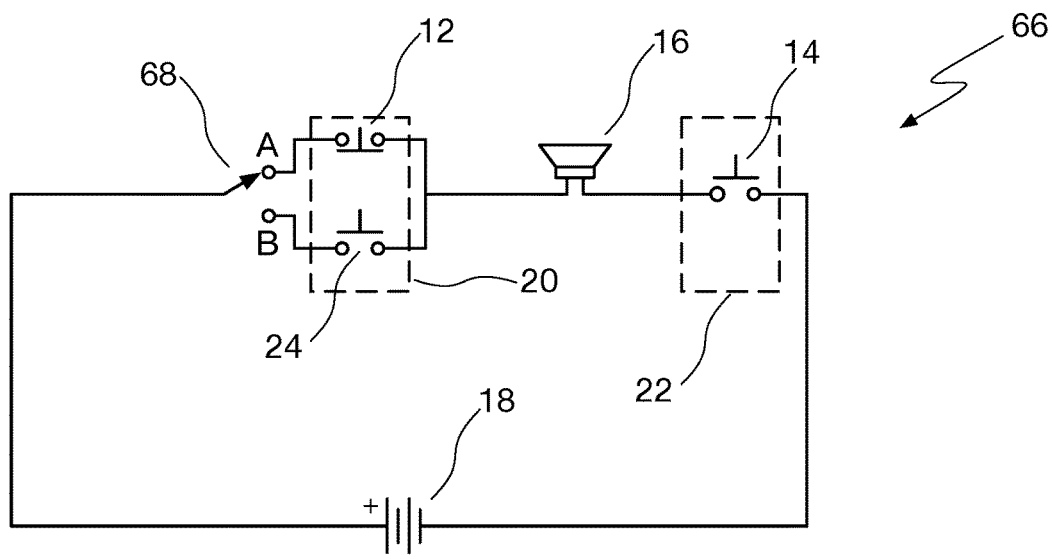
FIG. 3 is a schematic diagram of a portion of a universal reminder device that illustrates another aspect of the present invention.

Referring now to FIG. 3, a schematic diagram shows another aspect of the present invention in which a universal reminder device 66 combines the features of the embodiments in FIG. 1A and FIG. 1B and can employ more than one mode of operation. Like the universal reminder devices 10 and 30 of FIGS. 1A and 1B, universal reminder device 66 includes a normally-closed momentary switch 12, a normally-open momentary switch 14, a normally-open momentary switch 24, a buzzer 16 or other sound source such as a speaker driven by an audio oscillator, and a power source 18 such as a battery. As in the embodiments disclosed with reference to FIGS. 1A and 1B, the first and second switches 12, 14 and 24 may be pressure/weight sensors.

The illustrative embodiment used to show this aspect of the present invention includes a single-pole-double-throw (SPDT) toggle switch 68 in series between the battery 18 and the normally closed momentary switch 12 like that of FIG. 1A and the normally-open momentary switch 24 like that of FIG. 1B. When the toggle switch 68 is in the A position, the universal reminder device 66 operates in the same manner as the universal reminder device described with reference to FIG. 1A. When the toggle switch 68 is in the B position, the universal reminder device 66 operates in the same manner as the universal reminder device described with reference to FIG. 1B.

While the embodiment of FIG. 3 has been depicted and described with the switches 12, 14, and 24 locally hardwired to the remainder of the circuitry, persons of ordinary skill in the art will easily and readily be able to configure an embodiment employing one or more of these switches remotely as shown in the embodiment of FIG. 2.

Figure 4:
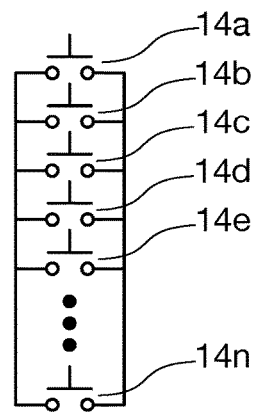
FIG. 4 is a schematic diagram showing multiple distributed multiple object-sensing switches.

Referring now to FIG. 4, an example is shown where a universal reminder device can include multiple switches 14a-14n connected in parallel. These switches may be hardwired to the main circuitry including the battery 18 and buzzer 16 or may be located remotely as shown in FIG. 2, and may be arranged either individually or in groups as taught herein with respect to the various applications. Such an arrangement can be useful, for example, where multiple switches may be arrayed across the area of a rear bench seat of a vehicle (or rear storage area of for example, an SUV) to detect the presence of a small pet or other object such as purse, etc., that cannot be expected to be found at any particular location on the seat. In other embodiments, parallel switches 14a-14n can be individually located at seats in a vehicle such as a school bus or other multi-passenger vehicle.

Figure 5:
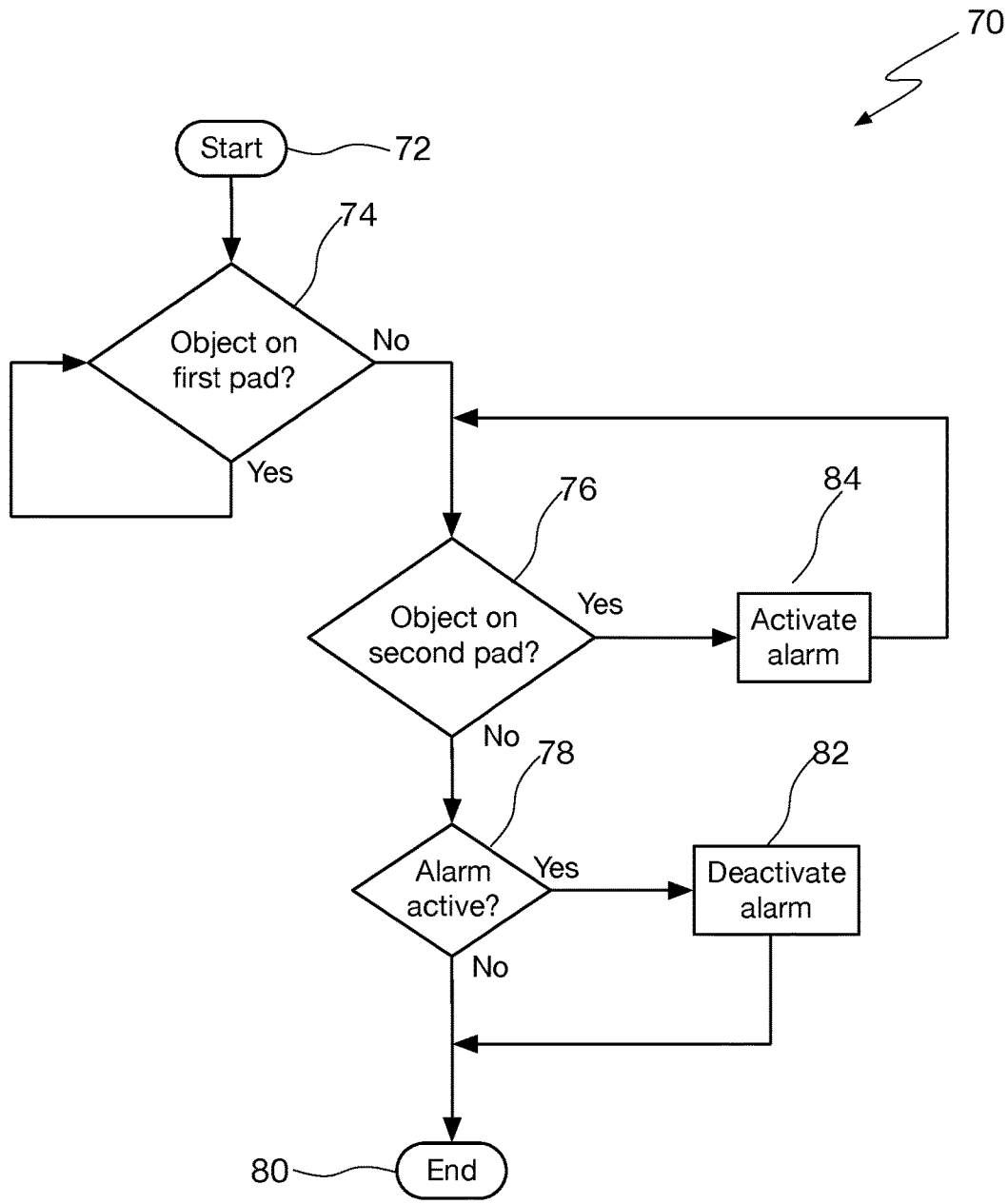
FIG. 5 is a flow diagram illustrating the practice of a method in accordance with an aspect of the present invention.

Referring now to FIG. 5, a flow diagram illustrates the practice of a method 70 in accordance with an aspect of the present invention. The method starts at reference numeral 72. The start of the process may optionally be triggered by an event such as, but not limited to, turning off a vehicle ignition.

At reference numeral 74, it is determined whether an object is sensed on the first pad. The process loops through reference numeral 74 to continually sense whether an object is sensed on the first pad. In one application of the present invention, the presence of a driver in a driver seat of a vehicle may be sensed. When the object is no longer sensed on the first pad, the process proceeds to reference numeral 76, where it is determined whether an object is sensed on the second pad. If no object is sensed, the process proceeds to reference numeral 78 where it is determined whether the alarm is activated. If not, the process ends at reference numeral 78. If the alarm is activated the process proceeds to reference numeral 82, where the alarm is deactivated. The process then ends at reference numeral 80.

If an object is sensed on the second pad at reference numeral 76, the process proceeds to reference numeral 84, where the alarm is activated. The process then loops to reference numeral 76 until the object is no longer present on the second pad. The process then proceeds to reference numeral 78. If the alarm is activated the process proceeds to reference numeral 82, where the alarm is deactivated. The process then ends at reference numeral 80.

Figure 6:
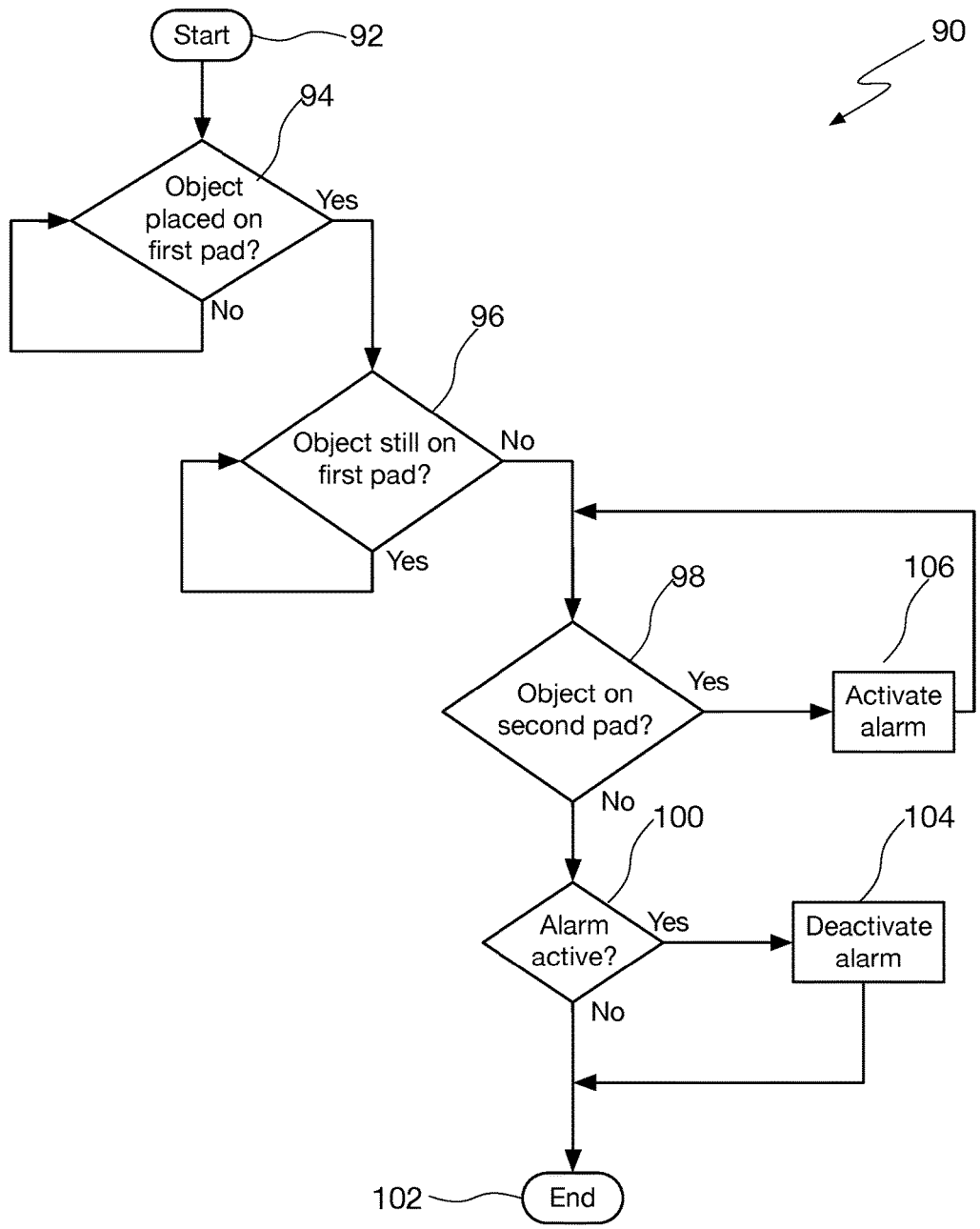
FIG. 6 is a flow diagram illustrating the practice of a method in accordance with an aspect of the present invention.

Referring now to FIG. 6, a flow diagram illustrates the practice of a method 90 in accordance with an aspect of the present invention. The method starts at reference numeral 92.

At reference numeral 94, it is determined whether an object has been placed on the first pad. The process loops through reference numeral 94 to continually sense whether an object has been placed on the first pad.

When an object has been placed on the first pad, the process proceeds to reference numeral 96, where it is determined whether the object is still on the first pad. The process loops through reference numeral 96 to continually sense whether an object has been placed on the first pad and proceeds to reference numeral 98 when the object has been removed from the first pad.

When the object is no longer sensed on the first pad, the process proceeds to reference numeral 98, where it is determined whether an object is sensed on the second pad. If no object is sensed, the process proceeds to reference numeral 100 where it is determined whether the alarm is activated. If not, the process ends at reference numeral 102. If the alarm is activated the process proceeds to reference numeral 104, where the alarm is deactivated. The process then ends at reference numeral 102.

If an object is sensed on the second pad at reference numeral 98, the process proceeds to reference numeral 106, where the alarm is activated. The process then loops to reference numeral 98 until the object is no longer present on the second pad. The process then proceeds to reference numeral 100. If the alarm is activated the process proceeds to reference numeral 104, where the alarm is deactivated. The process then ends at reference numeral 102.

Persons of ordinary skill in the art will observe that variations of the methods shown in FIG. 5 and FIG. 6 are possible and it is intended that such variations fall within the scope of the present invention. As a non-limiting example, the method of FIG. 5 can be initiated in several different ways depending on whether the object on the second pad, purse, child, etc., is placed on that pad before the object (e.g., driver), is sensed on the first pad or whether both possibilities are contemplated.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A universal reminder device comprising;
    a series circuit including:
    a power source;
    a warning indicator;
    a normally-closed momentary switch;
    a normally-open momentary switch;
    at least one of the normally-closed momentary switch and the normally-open momentary switch operable from a remote signal generated from a pressure-sensitive momentary switch configured to generate the remote signal;
    wherein the normally-closed momentary switch is a remote-controlled switch operable from a first remote signal;
    and the normally-open momentary switch is a remote-controlled switch operable from a second remote signal;
    the universal reminder device further comprising:
    a first pressure-sensitive normally closed momentary switch configured to generate the first remote signal; and
    a second pressure-sensitive normally open momentary switch configured to generate the second remote signal.

* * * * *